United States Patent [19]

Maldonado

[11] Patent Number: 5,790,203
[45] Date of Patent: Aug. 4, 1998

US005790203A

[54] DETECTOR OF COLOR TELEVISION STANDARD WITH LOW RECEPTION THRESHOLD

[75] Inventor: Pierre-Jean Maldonado, Seyssins, France

[73] Assignee: SGS-Thomson Microelectronics S.A., Saint Genis, France

[21] Appl. No.: 549,606

[22] Filed: Oct. 27, 1995

[30] Foreign Application Priority Data

Oct. 31, 1994 [FR] France ................. 94 13406

[51] Int. Cl.⁶ ........................................ H04N 5/46
[52] U.S. Cl. ..................... 348/558; 348/679; 348/682
[58] Field of Search ..................... 348/678, 679, 348/682, 683, 685, 558; H04N 5/52, 5/46

[56] References Cited

U.S. PATENT DOCUMENTS

| | | | |
|---|---|---|---|
| 4,438,451 | 3/1984 | Hinn et al. | 358/11 |
| 4,667,163 | 5/1987 | Gay | 348/678 |
| 5,267,024 | 11/1993 | Murayama | 358/26 |
| 5,287,170 | 2/1994 | Kim | 348/641 |
| 5,400,078 | 3/1995 | Maldonado | 348/558 |

FOREIGN PATENT DOCUMENTS

A-0 245 038  11/1987  European Pat. Off. ......... H04N 9/64

OTHER PUBLICATIONS

French Search Report from French Patent Application No. 94 13406, filed Oct.31, 1994.
Elektronik, vol. 37, No. 7, Mar. 30, 1988 Munchen DE, pp. 56–66, Ligertwood, P. "Analog-TV-Chip Digital Gesteuert, Chroma-4"-Konzept Macht Abgleich Überflüssig".
IEEE Transactions on Consumer Electronics, vol. 37, No. 3, Aug. 30, 1991, New York US, pp. 197–202 Imbert, M. et al., "A Full Integrated Automatic Multistandard Chroma Decoder".

*Primary Examiner*—Sherrie Hsia
*Attorney, Agent, or Firm*—Wolf, Greenfield & Sacks, P.C.; James H. Morris

[57] ABSTRACT

A circuit for identifying the standard of a color television signal includes a gain-controlled amplifier for standardizing an amplitude of oscillations of a composite video baseband signal during a reference burst centered on a reference level. The burst is designed for use by band-pass filters for identifying the standard and is preceded by a line synchronization pulse. The circuit also includes a device upstream of the amplifier for eliminating line synchronization pulses.

16 Claims, 2 Drawing Sheets

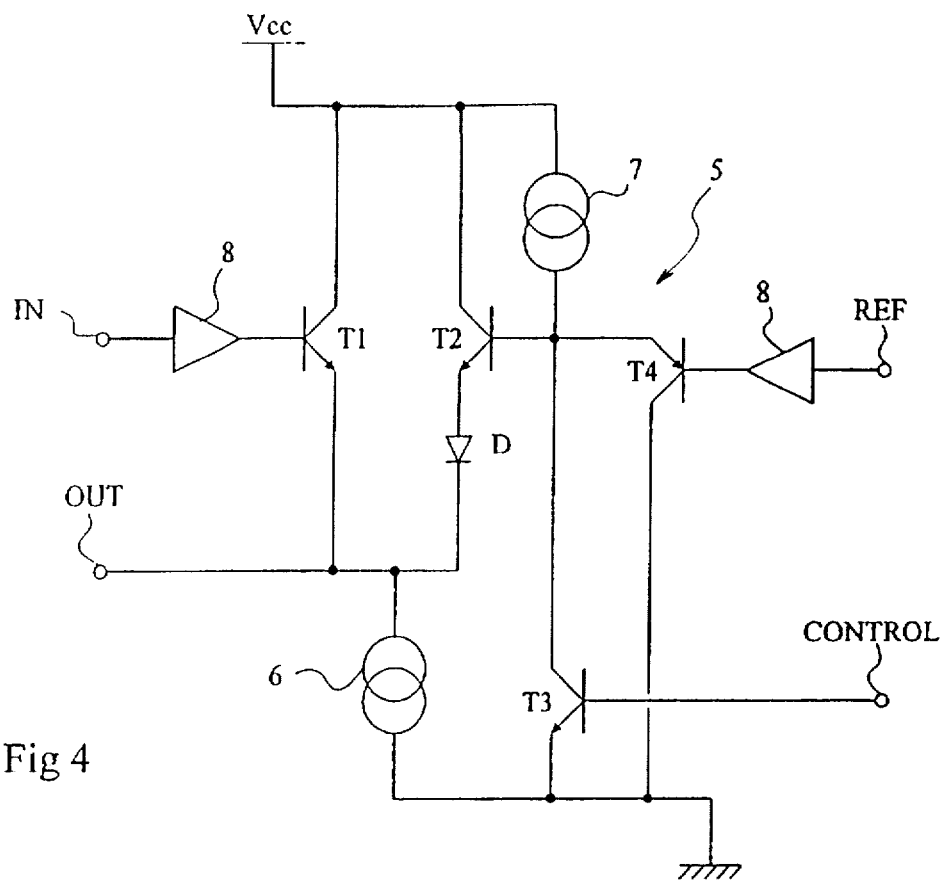
Fig 4
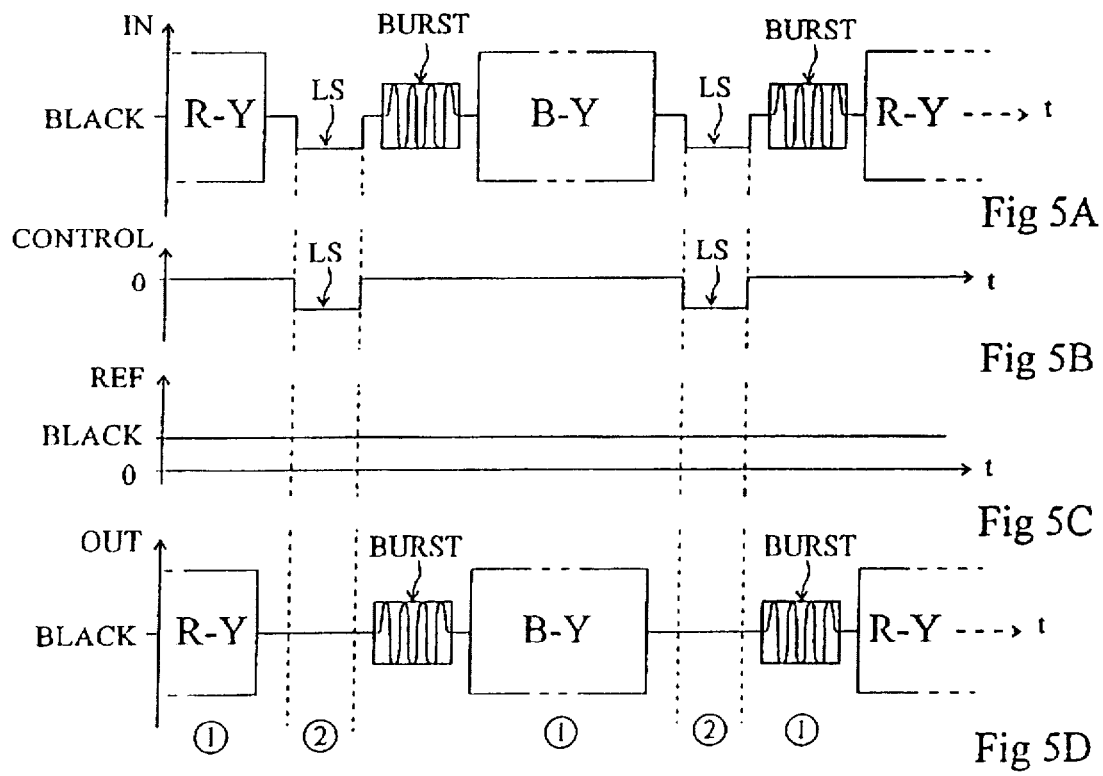
Fig 5A
Fig 5B
Fig 5C
Fig 5D

DETECTOR OF COLOR TELEVISION STANDARD WITH LOW RECEPTION THRESHOLD

BACKGROUND OF THE INVENTION

1. Field of the Invention

The present invention relates to a device for identifying the coding standard of signals received by a color television signal receiver. It more particularly applies to the implementation of such a circuit within an integrated multistandard reception circuit.

2. Discussion of the Related Art

A circuit for receiving television signals in a multistandard receiver conventionally includes a device for automatically identifying the standard according to which the color television signal is coded, and particularly the chrominance information. The chrominance information is extracted from the received signal by means of a band-pass filter eliminating the luminance information of the signal.

The chrominance information of a color television signal includes two parameters, commonly referred to as B-Y and R-Y, which, once demodulated, allow the receiver to recover the proportion of the three basic signal colors, that is, red, green, blue. The two parameters B-Y and R-Y are alternatively transmitted, i.e. one line out of two.

Three standards according to which the color television signal can be coded are to be distinguished. These standards are the SECAM standard, the PAL standard and the NTSC standard, and they are distinguished by the way in which the information to be transmitted is modulated.

For the SECAM standard, the signal is transmitted in amplitude and frequency modulation. The amplitude of the modulation contains the luminance information of the current line whereas the frequency of the modulation contains the chrominance information. The frequency modulation is performed alternatively, i.e. the carrier is different for the B-Y lines and for the R-Y lines. The carrier frequencies are generally respectively 4.25 MHz and 4.406 MHz for the B-Y and R-Y signals. The respective frequency modulation ranges are −350 to +500 kHz for the B-Y and −500 to +350 kHz for the R-Y.

For the PAL and NTSC standards, the modulation is a quadratic phase and amplitude modulation. The amplitude of the modulation contains, as previously, the luminance information, but the chrominance information of the current line is provided by the phase and the amplitude of the modulation. The frequency of the carrier is generally either 4.43 MHz or 3.58 MHz.

The difference between the PAL and NTSC standards is that for the PAL standard, the R-Y parameter is transmitted with a phase alternation of plus or minus ninety degrees.

Identifying the standard goes through the use of band-pass filters having a Q-factor of about three for the PAL and NTSC standards and of a bell filter having a Q-factor of about sixteen for the SECAM standard. The output signals of these filters allow to both perform the "time reset" of the receiver, that is, the synchronization with respect to the B-Y or R-Y type of line, and to determine the standard according to which the chrominance information is coded.

FIG. 1 is a schematic of the different elements of the receiver that are used for identifying the standard of the color television signal. In the drawing, only the elements that are necessary for the understanding of the problem have been shown.

FIGS. 2A to 2D are schematics of the structure of the signals in the circuit of FIG. 1.

The composite video baseband signal (CVBS) (FIG. 2A), here according to the SECAM standard, is sent to a gain-controlled amplifier 2 via a device for eliminating the d.c. component, such as a coupling capacitor 1. The amplifier 2 increases the level of the receive signal to a standardized level so as to authorize its decoding.

The CVBS signal successively includes a line synchronization pulse (LS), a BURST reference signal, and a line, alternatively B-Y and R-Y. The LS synchronization pulse and the BURST reference signal are transmitted during each line fly-back.

Identifying the standard within a multistandard receiver is conventionally performed during the reception of the reference signal, commonly called reference burst, i.e. at each line fly-back (FIG. 2B). The reference burst, preceded by the LS line synchronization pulse, is centered on a plateau region corresponding to the BLACK level of no chrominance data for the parameter considered. In other words, the BURST reference burst is inscribed in a plateau region corresponding to the level of "black" of parameter B-Y or R-Y.

During the reference burst, the chrominance signal corresponds, according to the SECAM standard, to the pure frequency of the carrier of the line considered. It corresponds to a 180° phase according to the NTSC standard, and to a 135° or 225° phase with respect to the line considered according to the PAL standard. The amplitude of the signal during a reference burst is standardized, i.e. it is approximately 300 mV peak-to-peak.

Identifying the standard is either performed on the entire burst (PAL or NTSC), or during a portion of this reference burst (SECAM). The time range during which the standard is being identified is commonly called a "Burst Gate" (BG) (FIG. 2C). The identification is performed in an identification block 3 controlled by the BG burst gate.

The amplifier 2 is associated with filters 4 for extracting the chrominance information present in the signal. The output signals of amplifier 2 correspond to the input signals of the chrominance filters 4 (band-pass and bell) assigned to the different standards. The output of the filters 4 provides a signal with a standardized amplitude (about 300 mV peak-to-peak) centered on the BLACK reference level which corresponds to the level of no chrominance data for the parameter considered. For purposes of clarity, only one identification block 3 and one filter 4 have been shown in FIG. 1.

A drawback of conventional circuits is that they require a high detection threshold to be set in order to avoid standard identification errors during reception of low level signals. Indeed, if a low level CVBS is received, all its a.c. components are amplified by the gain-controlled amplifier 2. Now, the edges of the LS synchronization pulses are turned into second order damped oscillations by chrominance filter 4 (FIG. 2D). The amplification of the trailing edge of the LS pulse deteriorates the signal-to-noise ratio of the reference burst, since the beginning of the burst gate BG is very close (about 0.9 µs) to said trailing edge. FIG. 2D illustrates this phenomenon where the amplification of the trailing edge of the LS synchronization pulse produces a non-negligible oscillation which superimposes on to the beginning of the reference burst.

In order to avoid the occurrence of standard identification errors, it is necessary, in conventional circuits, to set a minimum threshold for the reception level, beyond which it is impossible to correctly detect the standard according to which the chrominance information of the signal is coded.

3

This threshold is generally set at a value included between 20 and 30 mV. Indeed, if said threshold is not provided, the oscillations of the trailing edge of the synchronization pulses which are amplified run the risk of not being eliminated by the band-pass and bell filters 4, since the high frequency spectrum associated with the pulses is present in the band of filters 4. The amplification of the edges of the synchronization pulses will thus hinder correct identification of the standard.

SUMMARY OF THE INVENTION

The invention aims at overcoming this and other drawbacks by allowing reliable identification of the standard according to which the television signal is coded, and particularly the chrominance information of the signal by lowering the minimum detection threshold.

In order to achieve this and other objects, the present invention provides a circuit for identifying the standard of a color television signal including a gain-controlled amplifier standardizing the amplitude of the oscillations of the composite video baseband signal during a reference burst centered on a reference level, said burst having the purpose of being utilized by the band-pass filters for identifying the standard and being preceded by a line synchronization pulse, the circuit including a device for eliminating the line synchronization pulses upstream of said amplifier.

According to an embodiment of the invention, said device for eliminating the line synchronization pulses includes a switch for superimposing said reference level with the composite video signal at the occurrence of a synchronization pulse.

According to an embodiment of the invention, said device includes a first NPN-type bipolar transistor, the base of which constitutes a first input receiving the composite video signal, the collector of which is connected to a supply voltage, and the emitter of which is grounded through a first generator of biasing current, the output of the device being constituted by the emitter of said first transistor which is also connected to the output of said switch.

According to an embodiment of the invention, said switch is constituted by a second NPN-type bipolar transistor which receives said reference level on its base and the emitter of which is connected to the emitter of the first transistor, the collector of said second transistor being connected to the supply voltage.

According to an embodiment of the invention, a diode is interposed between the emitter of said second transistor and the output of the device.

According to an embodiment of the invention, the control of said switch is performed by means of a third NPN-type bipolar transistor, the base of which constitutes a second input of the device, the emitter of which is grounded, and the collector of which is connected to the base of the second transistor and, through a second generator of biasing current, to the supply voltage.

According to an embodiment of the invention, said reference level is sent on the base of the second transistor through a fourth PNP-type bipolar transistor, the base of which constitutes a third input of the device and the collector of which is grounded, the emitter of said fourth transistor being connected to the base of the second transistor.

According to an embodiment of the invention, the circuit is implemented in the form of a circuit integrating at least said device, said amplifier and said filters.

The foregoing and other objects, features and advantages of the present invention will be discussed in the following description of a specific embodiment, taken in conjunction with the accompanying drawings but not limited by them.

BRIEF DESCRIPTION OF THE DRAWINGS

FIG. 4 shows an embodiment of a device for eliminating the synchronization pulse of the circuit according to the invention; and FIGS. 5A to 5D illustrate the waveform of the signals of the device shown in FIG. 4.

For clarity, the timing diagrams of FIGS. 2A to 2D and 5A to 5D are not to scale and the same elements have been designated by the same numerals in the different drawings.

DETAILED DESCRIPTION

Figure 3:
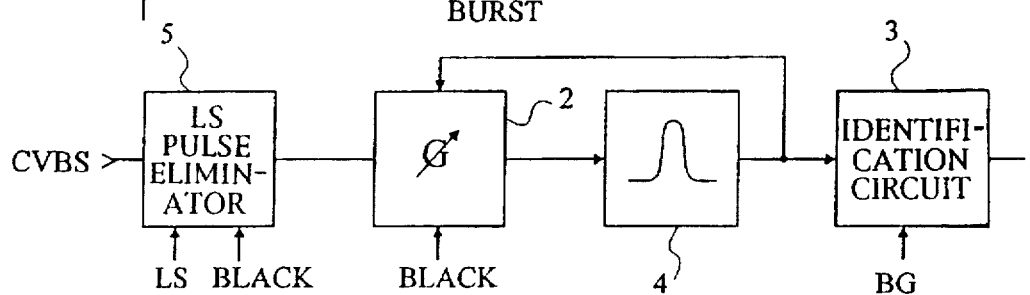
FIG. 3 shows an embodiment of a circuit for identifying the color television standard according to the invention.

Referring to FIG. 3, the invention provides, between the input of the CVBS signal and the gain-controlled amplifier 2, a device 5 for eliminating the LS pulse.

Thus, the baseband signal is no longer sent via a device for eliminating the d.c. component, such as a coupling capacitor. The CVBS signal is transformed by device 5 which allows duplication of the signal oscillations centered on the BLACK level of no chrominance information while eliminating the synchronization pulses.

Afterwards, the signal is amplified as previously by a gain-controlled amplifier 2, and is then sent on the input of the conventional band-pass and bell filters 4 for identifying the standard according to which the color television signal is coded.

FIG. 4 illustrates an embodiment of the device 5 for eliminating the line synchronization pulse according to the invention.

Figure 2A:
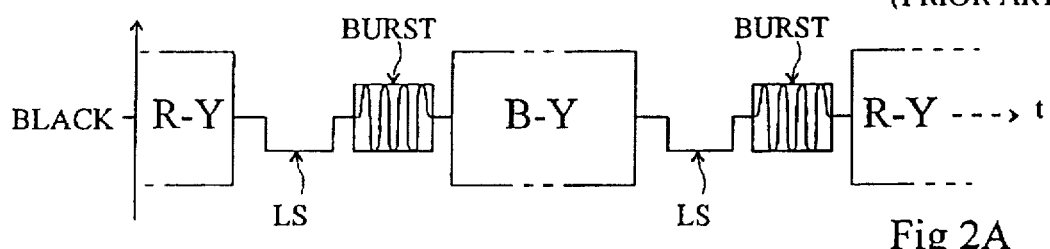
Figure 2B:
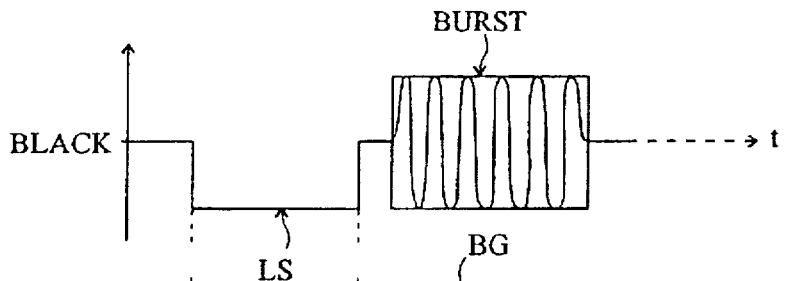
Figure 2C:
Figure 2D:
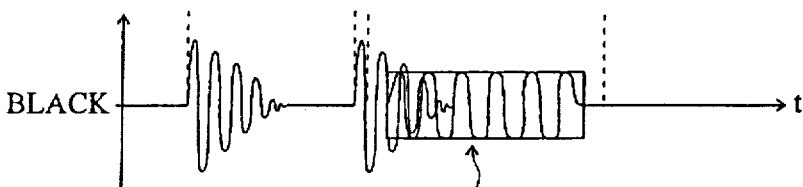

Said device receives on a first input terminal IN the CVBS signal as shown in FIG. 2A. The signal is sent on the base of an NPN-type bipolar transistor T1, the collector of which is connected to a supply voltage Vcc and the emitter of which constitutes the OUT output terminal of the device sent to amplifier 2. A first generator 6 of biasing current is connected between the emitter of transistor T1 and the ground.

The emitter of transistor T1 receives a d.c. component delivered by the emitter of an NPN-type bipolar transistor T2. Bipolar transistor T2, the collector of which is connected to the supply voltage Vcc, acts as a switch for superimposing a reference voltage with the composite signal.

Said switch is controlled by the synchronization pulses by means of an NPN-type bipolar transistor T3. The emitter of transistor T3 is grounded. The collector of transistor T3 is connected to the base of transistor T2 as well as, via a second generator 7 of biasing current, to the supply voltage Vcc. The base of transistor T3, which constitutes a second CONTROL input terminal, for controlling the device according to the invention, receives a signal including only the line synchronization pulses. This signal is available in a conventional circuit since it serves in particular for the synchronizing of the television sweep and since it is besides, for this purpose, extracted from the composite video signal.

Figure 1:
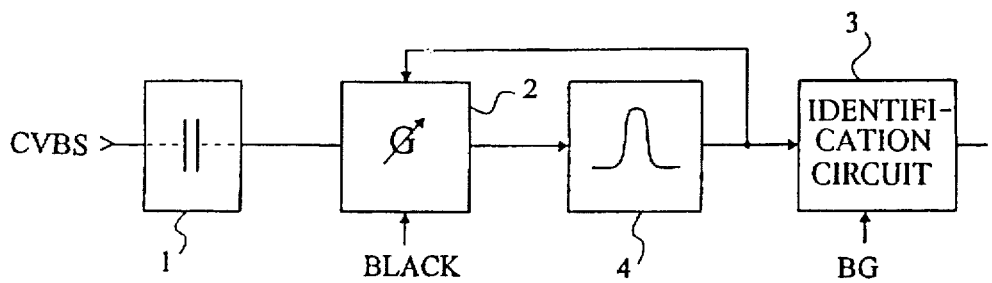
FIGS. 1 and 2A to 2D which have been previously described have the purpose of describing the state of the art and the problem to solve.

The reference voltage, which is superimposed on the composite signal under the control of the synchronization pulses, is delivered on the base of transistor T2 by the emitter of a PNP-type bipolar transistor T4. Transistor T4 receives on its base the BLACK level corresponding to no chrominance information. The base of transistor T4 constitutes a third input terminal REF of the device according to the invention and its collector is grounded. The BLACK reference level which represents the plateau region in which the reference burst inscribes itself is also available in a conventional receiver circuit. It is notably the level used by gain-controlled amplifier 2 (see FIG. 1).

In order to allow compensation on the BLACK reference level of the base-emitter voltage drop Vbe produced by transistor T1 on the level of the CVBS signal, a diode D is interposed between the emitter of transistor T2 and the output terminal OUT of the device. As for the base-emitter voltage drop produced by transistor T2 on the BLACK reference level, it is compensated by the base-emitter voltage drop of transistor T4.

Preferably, the first and third inputs of the device on which the levels to be further utilized by amplifier 2 are sent, are provided with follower devices 8. The generators of biasing current 6 and 7 are for instance based on transistors or resistors.

FIGS. 5A to 5D are timing diagrams illustrating the operation of the device shown in FIG. 4.

The signal (FIG. 5A) sent on the IN input of the device corresponds to the CVBS composite video baseband signal as shown in FIG. 2A.

The CONTROL input of the device receives a signal (FIG. 5B) including only the LS pulses.

The REF input receives the BLACK reference voltage level (FIG. 5C) which corresponds to the voltage level of the plateau region in which the reference BURST of the CVBS signal is inscribed.

FIG. 5D illustrates the waveform of the signal delivered at the output of the device according to the invention.

Between two synchronization pulses, transistor T3 conducts and transistor T2 is thus blocked. Hence, no d.c. component is added to the CVBS signal during the periods ① separating two LS synchronization pulses.

At the coming of a synchronization pulse and for its whole duration ② transistor T3 is blocked. Transistor T2 thus conducts. It reproduces on its emitter the BLACK voltage level present on the input REF of the device. The base-emitter voltage drops (Vbe) of transistors T2 and T4 mutually compensate and the diode D lowers the BLACK level by a Junction voltage Vbe, thus compensating the voltage drop Vbe produced by transistor T1 on the level of the CVBS signal.

As can be observed in FIG. 5D, the oscillations of the signal sent on the gain-controlled amplifier 2 now only correspond, during the line fly-back periods, to the oscillations of the reference burst.

The invention takes advantage of the existence, within the receiving circuit, of signals reproducing the line synchronization pulses and the reference level of the plateau region in which the reference burst is inscribed, to eliminate the synchronization pulses of the composite video signal by replacing them with the reference level. Thus, the signal which is amplified by the gain-controlled amplifier 2 no longer includes oscillations caused by the damping of the trailing edge of the synchronization pulse transmitted by a coupling capacitor. The reference burst thus no longer runs the risk of being contaminated by the oscillations.

As a result, the oscillations present during the reference burst include only the useful signal of the filters for identifying the standard. Hence, these oscillations can be amplified, even very strongly, without altering the signal-to-noise ratio.

In practice and according to the components used, a very small peak, linked to the switching of transistor T2, can appear on the edges of the synchronization pulses. But as this peak is no longer linked to the passing of a square pulse through a coupling capacitor, it has nearly disappeared at the time when the burst gate BG for extracting the reference burst begins.

The detection threshold of a circuit according to the invention can be lowered to a value of approximately 5 to 10 mV, and even lower.

Moreover, the invention is particularly convenient for an implementation in the form of an integrated circuit and thus can be part of the general integration of the components of a color television signal standard detector.

Of course, the present invention is likely to have various alterations and modifications which will readily occur to those skilled in the art. Particularly, each of the described components can be replaced by one or several elements assuming the same function. Besides, the dimensioning of the various components and particularly of the generators of biasing current is easily done by those skilled in the art.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalent thereto.

What is claimed is:

1. A circuit for identifying a standard of a color television signal, comprising: a gain-controlled amplifier standardizing an amplitude of oscillations of a composite video baseband signal during a reference burst centered on a reference level, said burst being utilized by band-pass filters for identifying the standard and being preceded by a line synchronization pulse, including upstream of said amplifier a device for eliminating line synchronization pulses.

2. A circuit for identifying a standard of a color television signal according to claim 1, wherein said device for eliminating line synchronization pulses includes a switch for superimposing said reference level with the composite video signal upon arrival of a synchronization pulse.

3. A circuit for identifying a standard of a color television signal according to claim 2, wherein said device includes a first NPN-type bipolar transistor, a base of which constitutes a first input receiving the composite video signal, a collector of which is connected to a supply voltage and an emitter of which is grounded through a first generator of biasing current, and an output of the device being constituted by the emitter of said first NPN-type bipolar transistor which is also connected to the output of said switch.

4. A circuit for identifying a standard of a color television signal according to claim 3, wherein said switch is constituted by a second NPN-type bipolar transistor which receives on a base said reference level, and an emitter of which is connected to the emitter of the first NPN-type bipolar transistor, a collector of said second transistor being connected to the supply voltage.

5. A circuit for identifying a standard of a color television signal according to claim 4, wherein a diode is interposed between the emitter of said second NPN-type bipolar transistor and the output of the device.

6. A circuit for identifying a standard of a color television signal according to claim 4, wherein control of said switch is performed by means of a third NPN-type bipolar transistor, a base of which constitutes a second input of the device, an emitter of which is grounded and a collector of which is connected to the base of the second NPN-type bipolar transistor and, through a second generator of biasing current, to the supply voltage.

7. A circuit for identifying a standard of a color television signal according to claim 6, wherein said reference level is sent on the base of the second transistor through a fourth PNP-type bipolar transistor, a base of which constitutes a third input of the device, and a collector of which is grounded, an emitter of said fourth transistor being connected to the base of the second transistor.

8. A circuit for identifying the standard of a color television signal according to claim 1, implemented in a circuit integrating, at least, said device, said amplifier and said filters.

9. A circuit for identifying a standard of a color television signal including:
- a means, receiving an input signal to be identified, for eliminating a line synchronization pulse;
- a gain stage receiving a signal from the means for eliminating the line synchronization pulse; and
- a filter, receiving a signal from the gain stage, for identifying the standard of the signal.

10. A circuit as claimed in claim 9, wherein the means for eliminating the line synchronization pulse includes a switch for superimposing a reference voltage on the input signal.

11. A circuit as claimed in claim 9, wherein the signal received by the filter includes oscillations corresponding to oscillations of a reference burst centered on a reference level.

12. A method for identifying a standard of a color television signal including the steps of:
- receiving a composite video baseband signal;
- eliminating a line synchronization pulse of the composite signal;
- standardizing an amplitude of oscillations of the composite signal during a reference burst centered on a reference level; and
- filtering the composite signal to identify the standard.

13. A method as claimed in claim 12, wherein the step of eliminating includes superimposing a reference voltage with the composite signal.

14. A method as claimed in claim 12, further including amplifying the standardized oscillations during the reference burst.

15. A method for identifying a standard of a color television signal comprising the steps of:
- receiving the color television signal;
- replacing a synchronization pulse of the color television signal with a reference level, thereby reducing oscillations in the synchronization pulse to create a processed signal; and
- filtering the processed signal to identify the standard of the color television signal.

16. A method as claimed in claim 15, further including amplifying the processed signal during the reference burst.

* * * * *